R. J. BURROWS.
INTERNAL GEAR DRIVE AXLE.
APPLICATION FILED FEB. 10, 1917. RENEWED JAN. 29, 1920.
1,354,462.
Patented Oct. 5, 1920.
3 SHEETS—SHEET 1.
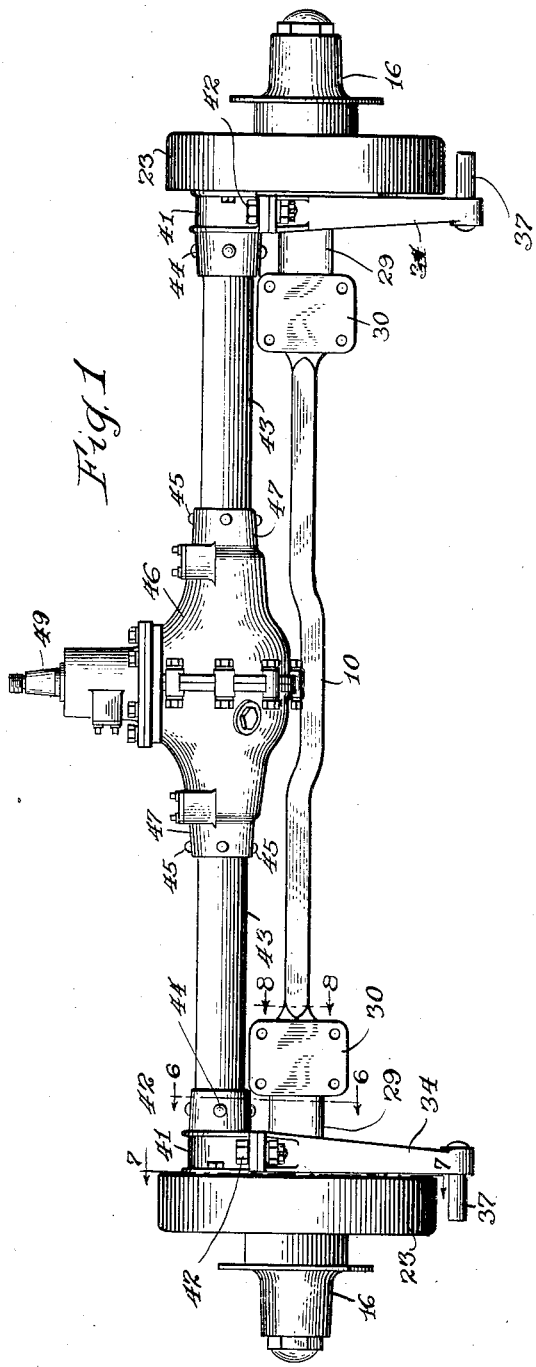
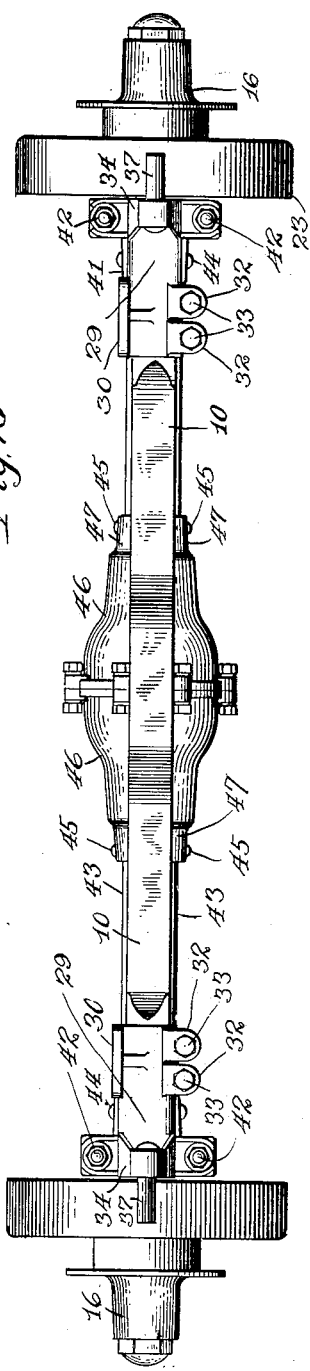

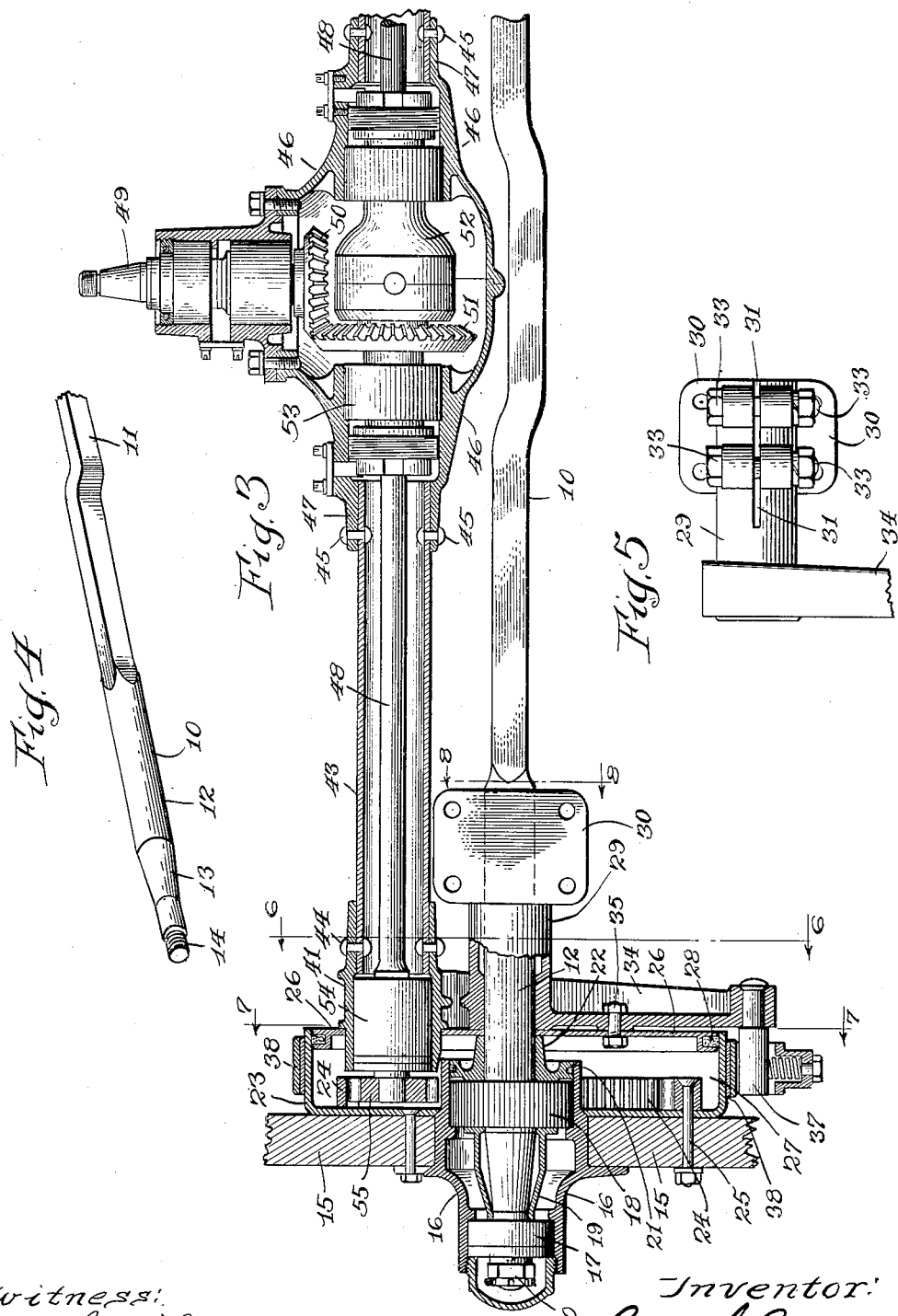

R. J. BURROWS.
INTERNAL GEAR DRIVE AXLE.
APPLICATION FILED FEB. 10, 1917. RENEWED JAN. 29, 1920.
1,354,462.
Patented Oct. 5, 1920.
3 SHEETS—SHEET 3.
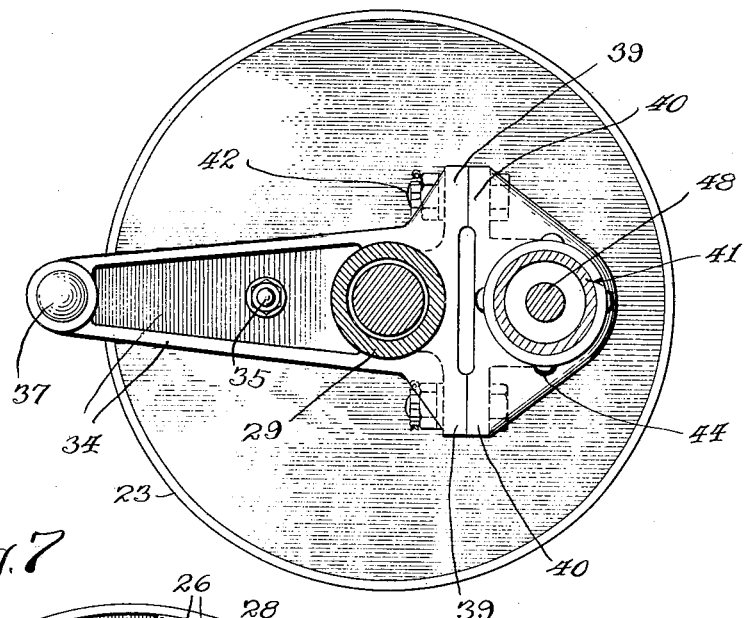
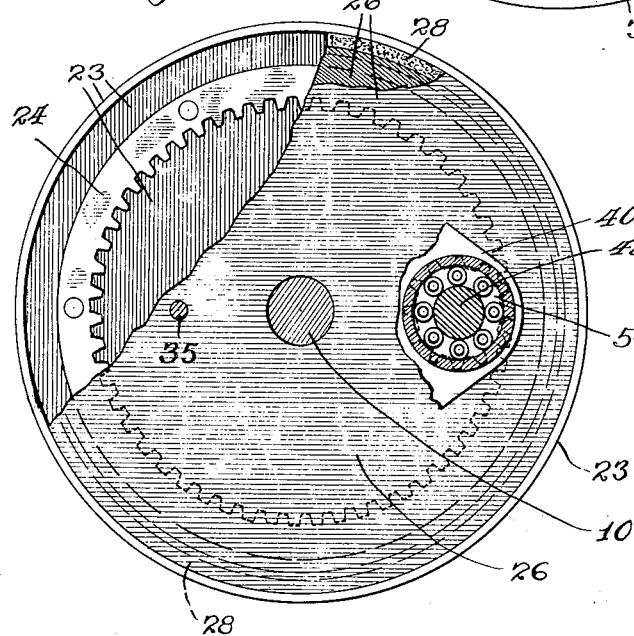
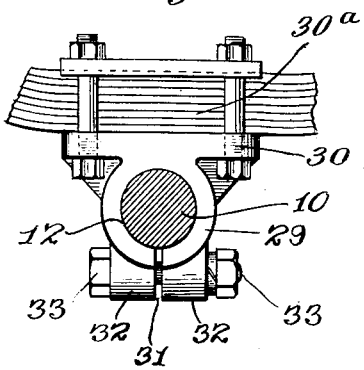
Witness:
L B Graham
Inventor:
Robert J. Burrows,
By Adams Jackson
Att'ys

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

INTERNAL-GEAR-DRIVE AXLE.

1,354,462.     Specification of Letters Patent.     Patented Oct. 5, 1920.

Application filed February 10, 1917, Serial No. 147,873. Renewed January 29, 1920. Serial No. 354,875.

*To all whom it may concern:*

Be it known that I, ROBERT J. BURROWS, a citizen of the United States, and a resident of Buchanan, in the county of Berrien, State of Michigan, have invented certain new and useful Improvements in Internal-Gear-Drive Axles, of which the following is a specification, reference being had to the accompanying drawings.

My invention relates to axles for automobile trucks and similar vehicles, and has particularly to do with what are known as "internal-gear-drive axles"—*i. e.* axles composed of two units, one being the load-sustaining member upon which the usual springs are mounted and which carries the wheels, and the other being the power-transmitting member which receives power from the motor, usually an internal combustion engine, and transmits it to the wheels by means of pinions which mesh with internal gears carried by the wheels. The former unit is usually termed the "dead-axle" since it has nothing to do with the propulsion of the vehicle, while the latter is commonly termed the "live axle" since it comprises axle members or shafts which by their rotation propel the vehicle.

Obviously, any axle which sustains a load is subject to deflection and vibration, and an axle of the character referred to which imposes this duty wholly upon the dead axle or load-sustaining member and relieves the live axle therefrom, is preferable to one in which it is imposed both upon the live and the dead axle members, since the live axle should be kept in as true alinement as possible under all conditions of loading in order to have the working parts free from distortion. The prime object of my present invention is to provide an improved internal-gear-drive axle in which the live axle is not subjected to any strains or loads of which it can be relieved, and to this end the two units are made as completely separate as possible. It will be apparent that the two axle units or members must be connected at some point in order to have a unitary axle and to absorb the driving strains and transmit them to the springs where they are absorbed, and as the dead axle has its greatest deflection and vibration under load at its middle and the least at its spring centers near the road wheels, the connection between the two members should be as near the spring centers as mechanical details will permit, and there should be no connection whatever between the two axle members near the middle of either unit. In my improved axle these characteristics are realized, as will be understood from the following description thereof in connection with the accompanying drawings, in which—

Figure 1 is a plan view of my improved axle;

Fig. 2 is a rear elevation thereof;

Fig. 3 is an enlarged horizontal sectional view of somewhat more than half the axle, certain parts being broken away;

Fig. 4 is a partial perspective view of the dead axle member;

Fig. 5 is a detail, being a bottom view of one of the spring seats and the parts to which it is attached;

Fig. 6 is a vertical section on line 6—6 of Fig. 3;

Fig. 7 is a vertical section on line 7—7 of Fig. 3, partly broken away; and

Fig. 8 is a vertical section on line 8—8 of Fig. 3, showing the mounting of one of the spring seats.

Referring to the drawings,—

10 indicates the dead axle member, which may be of any suitable construction, but is preferably a square bar offset at the center, as shown at 11, and having its end portions rounded, as shown at 12, and provided with tapered spindles 13 threaded at their ends, as shown at 14. 15 indicates one of the road wheels, the hub 16 of which is provided with bearings 17—18, and with a sleeve 19 which fits upon the spindle 13, the wheel being held in place by a nut 20 which screws upon the threaded portion 14. 21 indicates a circular dust-plate, in the form of a disk, which is provided with a sleeve 22 which fits upon the rounded portion 12 of the dead axle, the disk fitting into the inner end of the hub 16 in the usual way. These parts may be of any approved construction and form no part of my present invention.

23 indicates a brake-drum, preferably fixedly secured against the inner side of the wheel 15. At the side of said drum is an internal gear 24 which is fixedly secured to said drum and also to the wheel in any suitable way, as by bolts 25 shown in Fig. 3. 26 indicates a dust-plate fitted upon the rounded portion 12 of the dead axle and adapted to fit closely inside the brake-drum 23, forming a chamber 27 within the brake-drum. The plate 26 is provided with a marginal groove in which is fitted a felt ring or washer 28, making a tight connection between said plate and the brake-drum. 29 indicates a sleeve which is fitted upon the rounded portion 12 of the dead axle and carries one of the spring seats 30 to which springs 30ª are secured in the usual way, as shown in Fig. 8. As best shown in Figs. 5 and 8, said sleeve is split longitudinally for a part of its length, as shown at 31, and is provided with lugs 32 to receive bolts 33 by which said sleeve is clamped tightly upon the dead axle. 34 indicates an arm, preferably formed integral with the sleeve 29 and connected with the plate 26 by a bolt 35, as shown in Figs. 3 and 6. As shown in said figures, the arm 34 extends rearwardly from the dead axle in a horizontal position and carries a pin 37 upon which the usual brakes 38 are mounted. The arm 34 is continued at the opposite or forward side of the sleeve 29 to form lugs 39, as best shown in Fig. 6, the forward faces of said lugs being in the same plane so that corresponding lugs 40 carried by a sleeve 41 may fit against them and be secured thereto by bolts 42, as best shown in Figs. 1, 2 and 6. As best shown in Fig. 3, one end of the sleeve 41 extends through the dust-plate 26, while its opposite or inner end fits upon the outer end of a tube 43, to which it is fixedly secured by rivets 44. The inner end of the tube 43 is connected fixedly by rivets 45 to the usual differential housing 46, said housing being provided with a sleeve 47 to receive said tube, as shown. The differential housing 46 is located at the transverse center of the axle and incloses the usual differential gearing.

48 indicates live axle members, in the form of shafts, by which power is transmitted from a propeller-shaft 49 to the ground-wheels. In vehicles of this character the propeller-shaft is usually made in several sections, one of such sections being mounted in the differential housing or an equivalent supporting frame, and it is the latter section only that is illustrated in the drawings. Said propeller-shaft section, which is disposed longitudinally of the vehicle at right angles to the shafts 48, carries a beveled pinion 50 which meshes with a beveled gear 51 mounted on one of the shafts 48, the other shaft 48 being connected therewith through the differential gearing which is inclosed by a casing 52. 53 indicates a bearing for the inner end of the shaft 48, and 54 a similar bearing for the outer end of said shaft, the latter bearing being mounted in the sleeve 41, as shown. 55 indicates a spur pinion mounted on the outer end of the shaft 48 and meshing with the internal gear 24, as shown in Fig. 3.

The other shaft 48 is similar to that described. From the foregoing description it will be apparent that the propeller-shaft section 49 being rotated by a suitable motor, such as an internal combustion engine, power will be transmitted through the shafts 48, spur gears 55 and internal gears 24 to the ground-wheels.

The special feature of my improved axle is the manner in which the power transmitting members are attached to the load-sustaining or dead axle member so that the entire axle is a unit and all strains and loads imposed upon the several members are properly taken care of, at the same time relieving the live axle members of the load-sustaining strains and the deflection and vibration resulting therefrom. It will be noted that the propeller shaft supporting frame, which, in the construction illustrated, is the differential housing, is non-rotatably connected with the end portions of the load sustaining or dead axle member through the tubular members 43, the sleeves 41, the lugs 39—40, and the arms 34, and that the live axle housing, considered as a whole, is entirely disconnected intermediately from said dead axle member. Consequently driving strains set up by the mesh of the pinions 55 with the internal gears 24 are taken up through the bolts 42 and transmitted through the arms 34 and sleeves 29 to the vehicle springs, which are mounted upon the seats 30 in the usual way and driving strains set up by the beveled gears 50—51 at the middle of the live axle member are transmitted through the live axle housing considered as a whole, to the outer end portions thereof where such strains are also taken up through the bolts 42 and the parts already described. The load-sustaining axle member 10 is, of course, subject to deflection and vibration, but neither of these strains is transmitted to the live axle to any degree, as the deflection and vibration of the dead axle member are greatest at the middle where it is entirely free from the live axle member. The latter will therefore maintain its alinement regardless of deflection or vibration, and there is no distortion of the moving parts of the live axle member because of the fact that the two units of the axle are separate and each is called upon to do only its own especial work—the load-carrying unit to sustain the truck load, and the live axle unit to transmit the motive power to the ground-wheels. My improved axle, therefore, allows of a cheap and light construction for both units, as deflection of the load-sustaining axle member is not detrimental and the live axle member needs only to be strong enough to take care of its own internal strains. In addition to the advantages enumerated, my improved axle is also much simpler in construction than axles of the type in which two axle members or units are secured together at the center as well as at the ends, and the parts are more accessible for removal in case of repairs or damage, since the live axle unit may be disconnected from the load-sustaining unit by simply removing the bolts 42. In the construction illustrated, I have shown the live axle member as being substantially in the same horizontal plane as the dead axle member, but their position relative to each other may be varied without departing from my invention. Furthermore, while I have described with great particularity the details of my improved construction as illustrated in the drawings, my invention is not limited to such details of construction except in so far as they are particularly claimed, and although I have shown and described my invention as embodied in an internal gear drive axle certain features thereof may also be applied to other forms of gear driven axles, and the claims hereinafter made should be construed accordingly. I wish it to be understood further that my invention is not limited to the use of a live axle housing which incloses springs carried by the several members constituting the live axle as a whole, but includes any other suitable housing or frame adapted to support the parts of the live axle and to transmit the torque strains set up by the operation of the propeller-shaft to the dead axle member at the end portions thereof.

By the expression "entirely disconnected intermediately" used in describing the relation of the live and dead axle members in the claims hereinafter made, I mean that such axle members are not connected together at the center or so near the center as to subject the live axle member to the load-carrying strains which are intended to be sustained wholly by the dead axle member.

That which I claim as my invention, and desire to secure by Letters Patent, is,—

1. A gear-drive axle, comprising a dead axle member, a live axle housing entirely disconnected intermediately from said dead axle member and non-rotatably connected at its outer end portions therewith, and live axle members mounted in said live axle housing.

2. A gear-drive axle, comprising a dead axle member, spring seats carried by said dead axle member, a live axle housing entirely disconnected intermediately from said dead axle member and non-rotatably connected at its outer end portions with said spring seats, and live axle members mounted in said live axle housing.

3. A gear-drive axle, comprising a dead axle member, a live axle housing entirely disconnected intermediately from said dead axle member, means detachably connecting the outer end portions of said housing non-rotatably with said dead axle member, and live axle members mounted in said live axle housing.

4. A gear-drive axle, comprising a dead axle member, spring seats carried by said dead axle member, a live axle housing entirely disconnected intermediately from said dead axle member, means detachably connecting the outer end portions of said housing non-rotatably with said spring seats, and live axle members mounted in said live axle housing.

5. A gear-drive axle, comprising a dead axle member, brake-supporting members carried by said dead axle member, a live axle housing entirely disconnected intermediately from said dead axle member and non-rotatably connected at its outer end portions with said brake-supporting members, and live axle members mounted in said live axle housing.

6. An internal-gear-drive axle, comprising a dead axle member, brake-supporting members carried by said dead axle member, a live axle housing entirely disconnected intermediately from said dead axle member and non-rotatably connected at its outer end portions with said brake-supporting members, live axle members mounted in said live axle housing, and spring seats rigidly connected with said brake-supporting members.

7. An internal-gear-drive axle, comprising a dead axle member, brake-supporting members carried by said dead axle member, a live axle housing entirely disconnected intermediately from said dead axle member, means detachably connecting the outer end portions of said housing non-rotatably with said brake-supporting members, and live axle members mounted in said live axle housing.

8. An internal-gear-drive axle, comprising a dead axle member, sleeves mounted upon the outer end portions of said dead axle member, spring seats carried by said sleeves, brake-supporting members rigidly connected with said sleeves, a live axle housing entirely disconnected intermediately from said dead axle member and non-rotatably connected with said brake-supporting members, and live axle members mounted in said live axle housing.

9. An internal-gear-drive axle, comprising a dead axle member, sleeves mounted upon the outer end portions of said dead axle member, spring seats carried by said sleeves, brake-supporting members rigidly connected with said sleeves, a live axle housing entirely disconnected intermediately from said dead axle member and detachably connected non-rotatably with said brake supporting members, and live axle members mounted in said live axle housing.

10. A gear drive axle, comprising a dead axle member, springs carried thereby adjacent to the end portions thereof, a propeller shaft, live axle members driven by said propeller shaft, and means for supporting said live axle members and said propeller shaft, said means being entirely disconnected intermediately from said dead axle member and non-rotatably connected with said springs, whereby the torque strain set up by the operation of the propeller shaft will be taken up by said springs.

11. An axle comprising a dead axle member, springs supported thereby adjacent the end portions thereof, live axle members, means for driving said live axle members, and means for supporting said live axle members and transmitting to said springs the torque strains set up by the operation of said driving means.

12. An axle comprising a dead axle member, springs supported thereby adjacent the end portions thereof, live axle members supported independently of the intermediate portion of said dead axle member, means for driving said live axle members, and means for transmitting to said springs the torque strains set up by the operation of said driving means.

13. An axle comprising a dead axle member, springs supported thereby, a live axle housing, live axle members supported by said housing, and means for absorbing the torque of said housing and transmitting it to said springs.

14. An axle comprising a dead axle member, springs supported thereby, a live axle housing independent intermediately of said dead axle member, a live axle member supported by said housing, and means adjacent to the end portions of said housing for absorbing the torque of said housing and transmitting it to said springs.

15. An axle comprising a dead axle member, springs supported thereby, a live axle housing independent intermediately of said dead axle member, a live axle member supported by said housing, and arms carried by said dead axle member adjacent the end portions thereof and non-rotatably connected with the end portions of said housing.

16. An axle comprising a dead axle member, springs supported thereby, a live axle housing independent intermediately of said dead axle member, a live axle member supported by said housing, and arms carried by said dead axle member adjacent the end portions thereof and non-rotatably connected with the end portions of said housing, said arms being connected with said springs.

ROBERT J. BURROWS.